United States Patent [19]

Griggs

[11] 4,063,449
[45] Dec. 20, 1977

[54] AIR GAUGE FOR NOZZLE ASSEMBLIES

[76] Inventor: Elmer L. Griggs, 1720 Toledo, Burlingame, Calif. 94010

[21] Appl. No.: 734,444

[22] Filed: Oct. 21, 1976

[51] Int. Cl.² .............................................. G01F 25/00
[52] U.S. Cl. ........................................... 73/37.5; 73/3
[58] Field of Search ..................................... 73/37.5, 3

[56] References Cited

U.S. PATENT DOCUMENTS

| | | | |
|---|---|---|---|
| 2,293,725 | 8/1942 | Fiock et al. | 73/3 |
| 2,390,252 | 12/1945 | Hayward | 73/37.5 |
| 2,790,320 | 4/1957 | Salko et al. | 73/3 |
| 2,994,218 | 8/1961 | Frenzl | 73/37.5 |

FOREIGN PATENT DOCUMENTS 388,265  2/1933  United Kingdom ................. 73/37.5

*Primary Examiner*—Daniel M. Yasich
*Attorney, Agent, or Firm*—Robert Charles Hill

[57] ABSTRACT

Apparatus for measuring the flow area of a nozzle assembly is particularly applicable to structures such as jet engine nozzle assemblies or guide vane assemblies wherein a plurality of vanes or airfoil elements are supported in radially spaced apart relation, the apparatus including air moving means for supplying air through a first chamber, a second chamber, an air valve intermediate the chambers and the nozzle assembly. Measuring means are connected to each chamber to measure the respective air pressures. The apparatus can also include means for adjusting the size of the air valve opening between the two chambers as well as additional readout elements for facilitating the rapid and accurate measuring of the flow area of the nozzle assembly.

8 Claims, 6 Drawing Figures

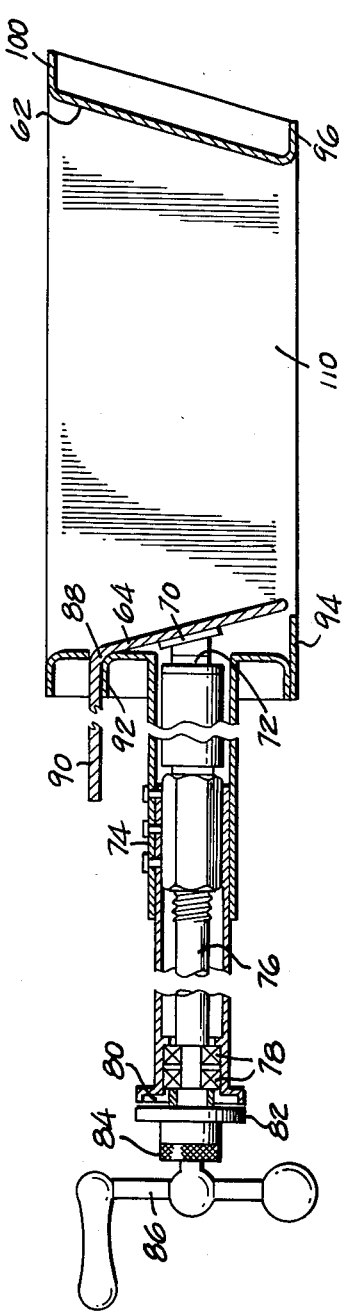
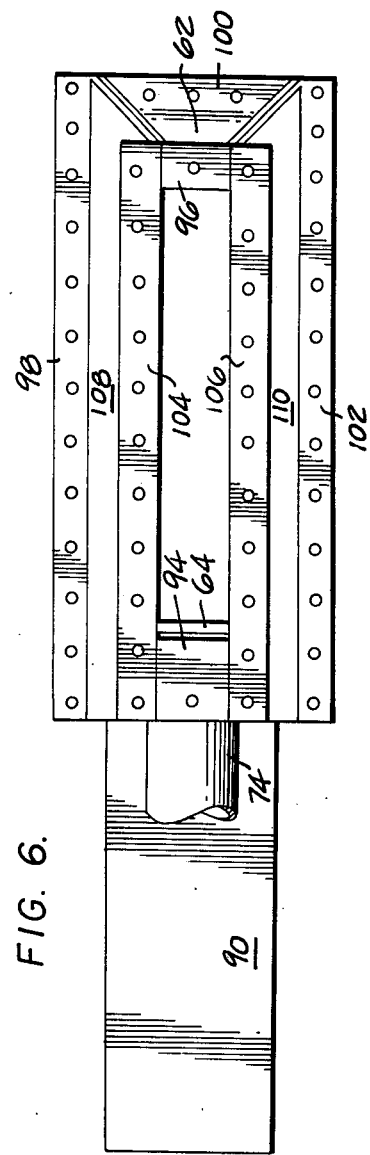
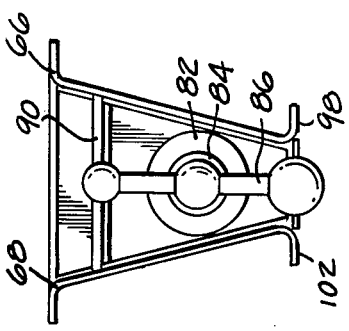

AIR GAUGE FOR NOZZLE ASSEMBLIES

BACKGROUND OF THE INVENTION

The present invention relates to an air gauge measuring apparatus. The air gauge apparatus is particularly contemplated for use in measuring the air flow through radially arranged airfoil elements such as guide vanes or turbine blades or nozzle assemblies in turbojet engines. However, it should be kept in mind that the apparatus can be used to test the air flow of any item having at least one gap or vent therein.

SUMMARY OF THE INVENTION

It is an object of the present invention to provide a new and improved air gauge for measuring the flow area of a nozzle assembly.

Another object of the invention is to provide an air gauge particularly suited for measuring the air flow through radially arranged airfoil elements such as guide vanes and turbine blades in turbojet engines.

A further object is to provide an air gauge of the character described above which is compact in dimension.

Additional objects and advantages of the invention are made apparent in the following description having reference to the accompanying drawings.

BRIEF DESCRIPTION OF THE DRAWINGS

FIG. 4 is a front view of an adjustable air valve which is intermediate the air chambers of the invention.

FIG. 5 is a side sectional view illustrating the adjustable air valve of FIG. 4.

FIG. 6 is a bottom view of the adjustable air valve.

DESCRIPTION OF THE PREFERRED EMBODIMENT

Figure 1:
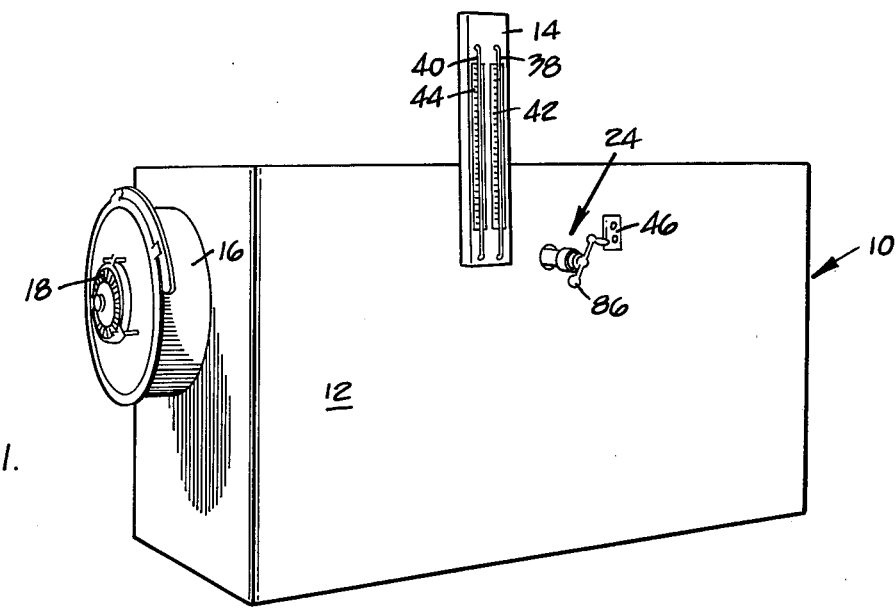
FIG. 1 is a perspective view of an air gauge constructed according to the present invention and particularly adapted for measuring the flow area of a nozzle assembly and having an air blower for moving the air.
Figure 3:
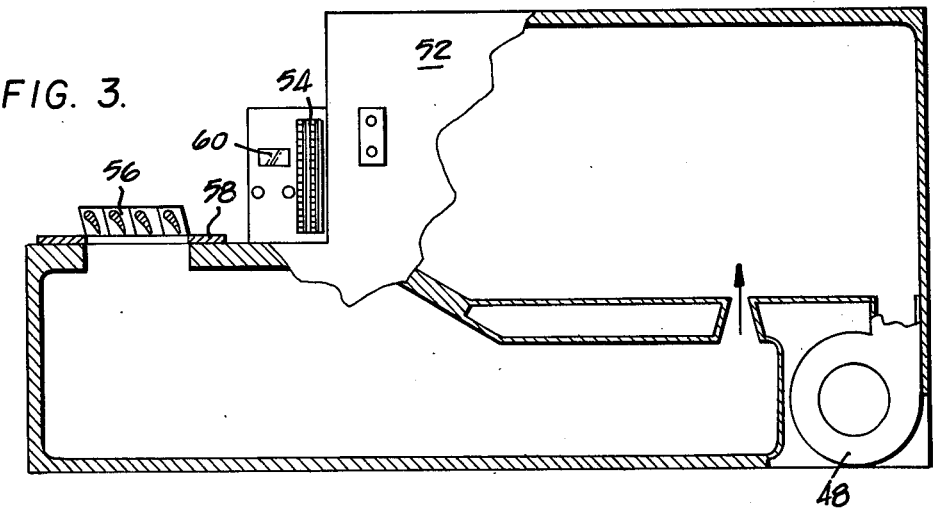
FIG. 3 is a side elevational view partially in section illustrating an air gauge having a vacuum motor for moving the air.

The present invention is preferably embodied within an air gauge of the types illustrated in FIGS. 1 and 3. Referring now to FIG. 1, the air gauge for nozzle assemblies, generally indicated 10, includes a housing 12, measuring means 14 and an adaptor 16. A nozzle assembly 18 including vanes or elements is firmly secured on the adaptor 16. The nozzle assembly 18 can be a circumferential arrangement of radially spaced apart guide vanes secured together by respective mounting flanges in a manner suitable for assembly into one stage of a turbojet engine. It will be apparent from the following description that an air gauge such as indicated at 10 may be employed with a wide variety of structures or assemblies having at least one gap or vent therein.

Figure 2:
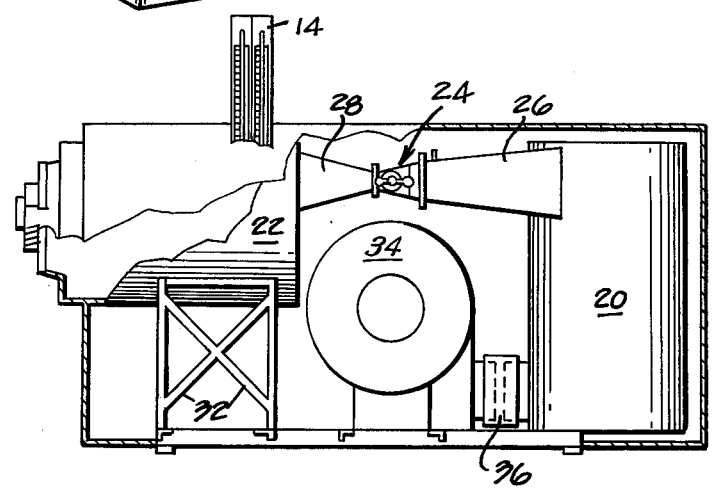
FIG. 2 is a side elevational view partially in section illustrating the air gauge of FIG. 1.

Referring now to FIG. 2, within the housing 12 are two air chambers, a first air chamber 20 and a second air chamber 22. An adjustable air valve 24 is intermediate the first 20 and second 22 air chambers. Detailed construction features of the adjustable air valve 24 are set forth in greater detail below. Connecting member 26 joins the first air chamber 20 to the air valve 24 while transition member 28 joins the second air chamber 22 to the air valve 24. An expansion chamber may be attached to member 28 to steady the readings in the measuring means 14. Standard cross member 32 supports the second air chamber 22 at the desired elevation within the housing 12. The housing or cabinet can be insulated if desired to reduce the noise level.

Pump 34 moves the air through coupling member 36, first air chamber 20, air valve 24, second air chamber 22 and nozzle assembly 18. A bleed valve (not shown) may be provided on air chamber 20 to compensate for various barometric and temperature changes. Switch 46 activates pump 34 thereby causing air movement.

The measuring means 14 includes two tube manometers 38 and 40 having their respective indicating means 42 and 44. The bottom of manometer 38 is connected to first air chamber 20 while the bottom of manometer 40 is connected to second air chamber 22.

FIG. 3 shows another embodiment of the present invention wherein the air moving means is vacuum motor 48. Although not shown, the housing 52 of this air gauge has all of the features of the device shown in FIG. 2, namely, first and second air chambers, and adjustable air valve and connecting members.

With the use of vacuum motor 48, the measuring means 54 are connected to the respective air chambers at the top thereof rather than at the bottom as is the case with the pump 34 in FIG. 2. Additionally, the nozzle assembly 56 is placed on the adaptor 58 parallel to the ground and does not require any bolts or clamps to secure it thereto. If desired a digital readout 60 can be provided by means of an electronic setting in cojunction with pressure transducers and amplifiers to detect very small differences in the pressures within the two air chambers, the specific details of which are not of critical importance to the present invention.

With either air moving means it is important that the air pass through the nozzle assembly on the air gauge in the same way as it passes through in the jet engine, that is, the air strikes the leading edge of the nozzle assembly before it strikes the trailing edge. Thus, with the air pump 34 the leading edge of the nozzle assembly 18 is adjacent the adaptor 16 while with the vacuum motor 48 the trailing edge of nozzle assembly 56 is adjacent the adaptor 58.

As to components within the adjustable air valve 24, reference is made to FIGS. 4 through 6. Stationary end plate 62, movable valve plate 64, top plate 66 and bottom plate 68 direct air in the direction of the arrow through the truncated valve opening. Angle plate 70, spacer 72, housing 74, screw 76, bearings 78, clamp 80, dial 82, lock nut 84 and handle 86 all cooperate to adjust the distance between valve plate 64 and end plate 62. Valve plate 64 has a curved section 88 and a straight section 90 which extends through assembly 92 thereby allowing the valve opening to become very small if desired.

Plates 94 and 96, top mounting members 98, 100 and 102, bottom mounting members 104 and 106, and walls 108 and 110 all cooperate to form the truncated opening. The rounded edges on the other plate members reduce the air turbulence so that a relatively even flow of air passes through the truncated opening with use of either the air pump 34 or the vacuum motor 48. Thus it can be seen that rotating handle 86 moves valve plate 64 a minimal distance thereby providing micrometer adjustment of the valve opening.

In actual operation and using the gauge of FIGS. 1 and 2 for illustrative purposes, a nozzle assembly 18 having a known flow area or a nozzle assembly which performs satisfactorily for the intended purpose such as a manufacturer's master or standard is affixed to adaptor by means of clamps. Switch 46 is turned on to activate air pump 34 thereby moving air through coupling 36, first air chamber 20, member 26, adjustable air valve 24, member 28, second air chamber 22, adaptor 16 and nozzle assembly 18. With a 15 horsepower blower at 34, the air pressure within first air chamber 20 will be around 27 inches water and the air pressure within the second air chamber will be around 14 inches. Thus, in order to have nearly identical readings on the manometers 38 and 40, a heavier measuring liquid is placed within manometer 38 since it is connected to first air chamber 20. Usually this liquid is approximately 1.5 to 2 times as heavy as the liquid within manometer 40. One combination which has worked very well is to put water within manometer 40 and a liquid such as "blue oil" within manometer 38, which "blue oil" is about 1.8 the weight of water. Careful adjustment of the air valve 20 will then produce identical readings on the manometers by either increasing or decreasing the relative pressure within the two air chambers.

Once identical readings are obtained for the known nozzle assembly, the pump 34 is turned off and another nozzle assembly 18 is positioned on the adaptor. With the known fixed differential air pressures in the two chambers, it is easy to compare the new air flow as registered on the manometers. Any adjustment on the air valve 24 to balance the manometer readings can thus be correlated to an actual difference in air flow through the nozzle assembly. It can thus be seen that the measuring is based on a pressure differential controlled by the adjustable air valve 24. Of course, the valve 24 could also be connected to motorized equipment for a remote readout. The valve 24 could also be equipped to provide an automatic adjustment responsive to any pressure differential in the chambers.

Another way to measure the flow area through the nozzle assembly is to leave the identical readings for the standard nozzle assembly and keep the air valve in that position and just record the difference in the manometer readings for the subsequent nozzle assemblies. If a digital readout is provided, the number 100 can be the standard while other numbers such as 99, 98, 101, 102, etc., will correlate directly to a different flow area. This fast method eliminates all valve adjusting and also allows the master or standard to be returned routinely within the measuring cycle to check for consistency. The recirculating in line air system of this invention minimizes outside influences which could distort the air flow from its source.

It will be obvious that numerous modifications and variations are possible for the above described air gauge for nozzle assemblies within the scope of the present invention. The foregoing description, as setting forth various constructional and operational details for purposes of and understanding of the invention only, is not to be taken as limiting the scope of the present invention which is defined only by the following claims.

I claim:

1. An air gauge for measuring the flow area of a nozzle assembly, comprising:
   housing means,
   an adaptor on said housing means for receiving the nozzle assembly,
   a first air chamber within said housing in air communication with said nozzle assembly,
   a second air chamber within said housing and in air communication series with said first air chamber,
   an adjustable air valve intermediate said first and second chambers,
   measuring means connected separately to said first chamber and to said second chamber for measuring the air pressures therein, and
   air moving means carried by said housing for supplying air sequentially through said first chamber, said air valve, said second chamber and said nozzle assembly.

2. The air gauge of claim 1 wherein the air moving means is an air blower.

3. The air gauge of claim 1 wherein the measuring means are manometers.

4. The air gauge of claim 3 wherein the liquid in one manometer is heavier than the liquid in the other manometer.

5. The air gauge of claim 4 wherein the one liquid is approximately 1.5 to 2 times as heavy as the other liquid.

6. The air gauge of claim 1 wherein the adjustable air valve has an opening therethrough which is truncated in shape.

7. An air gauge for measuring the flow area of nozzle assembly, comprising:
   housing means,
   an adaptor on said housing means for receiving the nozzle assembly,
   a first air chamber within said housing in air communication with said nozzle assembly,
   a second air chamber within said housing and in air communication series with said first air chamber,
   an adjustable air valve intermediate said first and second chambers,
   measuring means connected separately to said first chamber and to said second chamber for measuring the air pressures therein, and
   air moving means for supplying air sequentially through said nozzle assembly, one of said chambers, and air valve and the other chamber.

8. The air gauge of claim 4 wherein the air moving means is a vacuum motor.

* * * * *